May 4, 1948.  W. C. MOORE  2,440,967
SCREW THREAD GAUGING DEVICE
Original Filed May 11, 1943
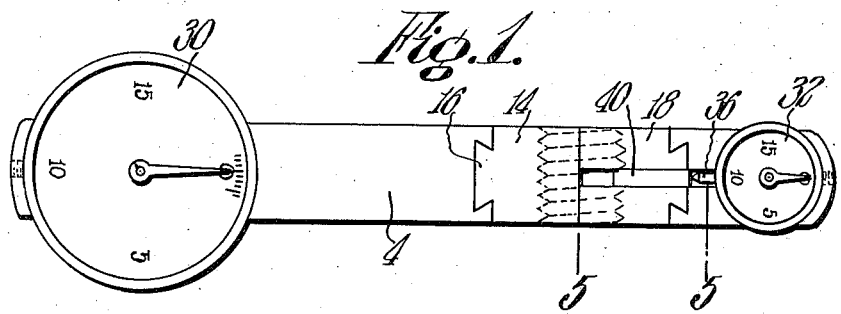
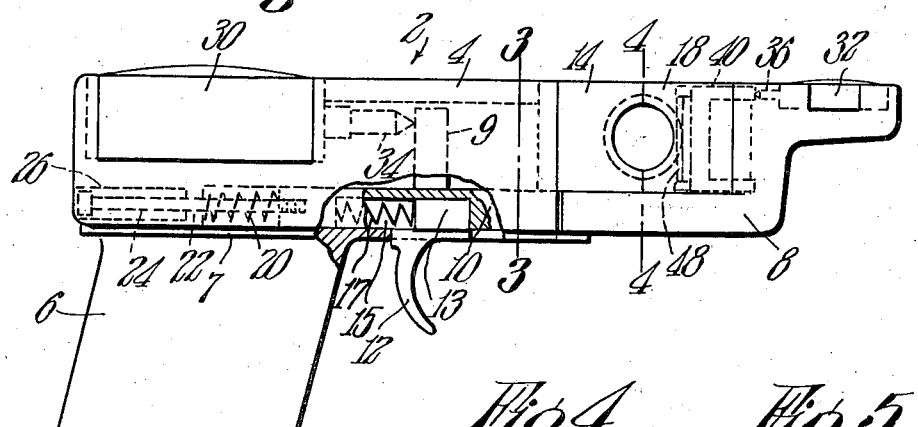
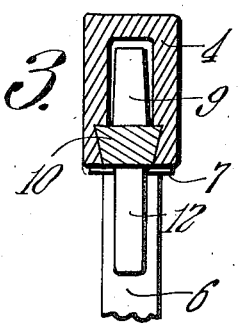
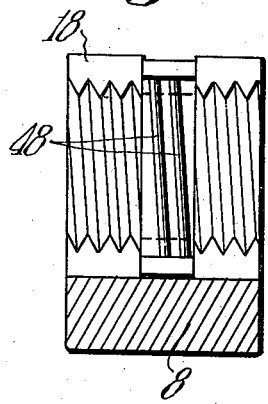
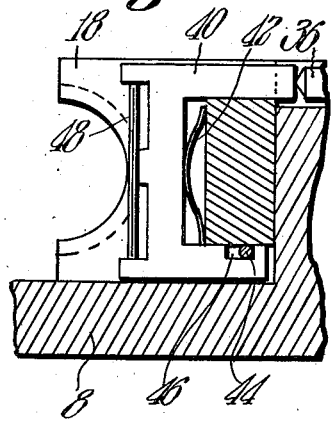
INVENTOR.
William C. Moore.
BY Watts C. Ross. Attorney.

Patented May 4, 1948

2,440,967

UNITED STATES PATENT OFFICE 2,440,967

SCREW-THREAD GAUGING DEVICE

William Clay Moore, Springfield, Mass., assignor to Johnson Gage Company, Bloomfield, Conn., a partnership of Connecticut Continuation of application Serial No. 486,526, May 11, 1943. This application November 15, 1943, Serial No. 510,390

15 Claims. (Cl. 33—199)

This invention relates to improvements in tools and is directed more particularly to improvements in gauging devices for screw threads. This application is a continuation of my application Serial Number 486,526, filed May 11, 1943, which is now abandoned.

The principal objects of the invention are directed to the provision of a gauge for gauging the threads of screws and the like which is characterized by its novel construction and arrangement.

According to one feature of the invention, the gauge device is adapted for engagement by the hand so that it may be operated much after the manner of a hand gun thereby to facilitate speed in gauging operations.

According to another feature of the invention, the gauge is constructed and arranged to simultaneously gauge and indicate the important characteristics such as thread form, lead or pitch, inner diameter, pitch diameter, etc., of screw threads.

Another object is to construct a gauge for screw threads having gauging means which includes a plurality of gauging elements or blocks with cooperating concave gauging surfaces which slidably open and close for the insertion of a test part or screw therein.

A still further object is to construct a screw thread gauge having gauging means which includes a pair of gauging elements or blocks with cooperating concave gauging surfaces which slidably open and close for the insertion of a screw to be tested therein in cooperation with a second gauging means which tests for pitch diameter at the same time that the gauging blocks are testing the screw.

Another object is to construct a gauge which tests a thread for one or more thread characteristics such as lead, thread form, et cetera, and simultaneously with this test also tests for pitch diameter.

The gauge device is adapted for broad application and various changes may be made to adapt the same for various screw thread gauging operations without departing from the spirit and scope of the invention.

In the drawings:

Figure 1 is a plan view of a gauge device embodying the novel features of the invention;

Figure 2 is a side elevational view of the gauge device shown in Figure 1;

Figure 3 is a sectional elevational view on the line 3—3 of Figure 2;

Figure 4 is a sectional elevational view on the line 4—4 of Figure 2; and

Figure 5 is a similar view on the line 5—5 of Figure 1.

In gauging a screw thread various elements of the thread are tested in order to determine whether or not the same will assemble with its mating part such as a nut or other threaded hole. The best test for assembly-ability is a ring gauge which gives a test around the entire periphery of its screw, it is, however, slow in operation or use and is subject to excessive wear especially at the mouth of the gauge. The gauge to be described herein gives peripheral contact as effectively as in a ring gauge but has the speed of operation of a snap gauge and is not subject to the excessive wear at the mouth as with a solid ring gauge. The ring gauge although providing an adequate test for assembly-ability, is nevertheless inadequate to test the pitch diameter so that a screw may assemble in a threaded hole but be too small and hence lack strength when assembled with its mating part. It is customary therefore to test also the pitch diameter of the screw with a second gauge in a separate operation. In the gauge herein the test for assembly-ability and for pitch diameter is made simultaneously thereby giving a double test in one operation, which heretofore has required two operations.

Any suitable means may be provided upon which the gauging elements are mounted. The means shown is constructed for holding in the hand of the inspector or operator and includes a frame 2 which includes an upper body or barrel part 4 and a lower hand grip 6 which will be suitably formed for conveniently gripping by the hand and its shape and size may vary within wide limits for that purpose. The hand grip may have a plate or flange 7 for securing the grip to the underside of the body by the means of screws, not shown.

The frame carries a slide 8 at the forward end of the body 4 which has a rear tongue 10 that is slidably retained in the body, as shown in Fig. 3 so that the slide may move relatively thereto. The slide may be moved by any desirable means that particularly shown being a finger-engaging trigger 12 carried by the tongue for engagement by the finger.

The member 12 has an upper part 13 slidable in a groove 15 in the lower side of the tongue and the trigger projects through a longitudinal slot in the plate 7, as shown in Fig. 2. A spring 17 in the groove 15 acts on the trigger and resists movement of the trigger rearwardly relative to the tongue 10 while the rear end of the trigger is arranged to abut the rear end of the slot in plate 7 to limit movement of the trigger rearwardly of the body.

The gauging means includes a pair of cooperating gauge blocks which open and close for the insertion of a test screw therein. A gauge block 14 is provided that has a dovetail connection 16 with the body 4 and a mating gauge block 18 is similarly connected to the slide. These blocks are removable from the body and slide respectively. The gauge blocks have concave gauging portions provided with internal screw threads, as will appear for receiving a screw therebetween. The blocks are removable in order to provide numerous pairs of blocks for use in gauging screw threads of various types and sizes.

Means may be provided to open and normally hold open the gauging means. A spring 20 between the rearmost end of the tongue 10 and an abutment 22 urges the slide forwardly from the position shown in Figs. 1 and 2. If desired, stop means may consist of a screw 24 in engagement with the tongue 10, the underside of the head of the screw being arranged to abut the bottom of a socket 26 in the body to limit outward or forward movements of the slide relative to the body 4.

Suitable indicating means is provided to determine whether or not a screw is within the allowable limits. The indicators 30 and 32 illustrated, are of the dial type and are fixed to the body and slide respectively in any suitable manner. These indicators are of the well known type having plungers 34 and 36 that are spring pressed outwardly. When the plungers are moved inwardly they operate pointers that register with graduations or indicia on dials as shown. Small movements of the plungers inwardly are indicated by relatively large movements of the pointers, which is usual with indicators of the type referred to.

With the slide urged forwardly by spring 20 the gauging blocks 14 and 18 are separated or opened so that the screw to be gauged may be placed therebetween. With the grip 6 in the hand the slide may be moved rearwardly by engaging the trigger 12 with the finger so that the screw being gauged is embraced by or between the blocks 14 and 18. In gauging position, the blocks have full or substantially full peripheral contact with the screw and hence gives a test which is the equivalent of that given by a ring gauge.

An abutment 9 on the tongue 10 engages the plunger 34 of the indicator 30 so that it is operated thereby in a gauging operation.

The gauge may be provided with means for gauging the pitch diameter of the screw being tested at the same time that the gauging blocks test the screw for assembly-ability. The pitch diameter gauge means engages in the groove of one or two threads while the gauging blocks engage the screw and an indicator determines whether or not this diameter is within the allowable limits. Preferably the two gauging operations occur simultaneously. In order to accomplish this the center of the thread is exposed by a groove, recess or opening in the block gauging means and as illustrated this groove may be in one gauging block. The pitch diameter gauge or means is carried by any suitable part of the gauge so that it cooperates with the other gauging means and so that only one additional gauging element is needed namely the pitch diameter gauging element. This gauging element is preferably carried by or mounted upon one of the gauge blocks and cooperates with the other and is illustrated as mounted upon the movable gauge block 18. In this double gauge both of which parts engage the test part simultaneously it is not essential that the cooperating gauging means be in the form of gauge blocks or have sliding movements. In order to simultaneously gauge the test part it is only necessary that one of the sets of gauging means be movable in order to obtain a test from both parts of the gauge simultaneously.

The block 18 is provided with grooves on its upper, lower and inner sides, as shown, to receive a U-shaped pilot member 40. This member 40 may move back and forth relative to the block 18 and it is spring pressed rearwardly by some suitable means such as a spring 42. A transverse pin 44 carried by the block is disposed in a notch 46 of the pilot 40 to limit movements of said pilot inwardly of the block.

The pitch diameter gauging means or element may be of any desired form and is carried by the pilot 40. The gauging means shown includes one or two pitch members 48 such as a wire or rod having their opposite ends fixed to the inner side of the pilot 40. These are arranged to engage between the threads of a screw being gauged and at the pitch diameter thereof. The members 48 are secured at their ends as shown in Figs. 4 and 5 and may be slightly yieldable intermediate said ends longitudinally of the screw being gauged in order to accommodate themselves to screw threads which are not inaccurate beyond a predetermined desired degree. The members 48 are restrained or backed such as by a projection in order to prevent lateral yielding or yielding away from the test part.

Any suitable indicating means may be used to indicate the position of the pitch diameter gauging means. A dial type indicator 32 is shown, the plunger 37 of which engages the pilot at the upper end thereof. This indicator is carried by the slide 8.

The screw threads of the blocks 14 and 18 together with members 48 are such that when a perfect screw is engaged between the blocks the pointers of the indicators register with certain indicia of the dials thus indicating the correctness of the characteristics of the screw.

In Figs. 1 and 2 of the drawings, the slide 8 is in its rearmost gauging position for clearness as though the grip were engaged by the hand and the trigger engaged by a finger. Normally, when the trigger is released, spring 20 urges the slide forwardly relatively to the body so that the blocks are separated to permit a screw to be gauged to be inserted between the blocks.

With the grip engaged by the hand and the slide in its forward position so that the blocks are separated, a screw to be engaged is inserted between the blocks. Then the trigger is engaged and pressed on so that through spring 17 the slide 8 is moved rearwardly closing the blocks which embraces the screw.

Pressure on the trigger brings it into engagement with the left hand end of the slot in plate 7 and when held in this stop position spring 17, which is sufficient to overcome spring 20, causes the blocks to engage the screw being gauged with a certain pressure according to the characteristics of said spring 17.

In the present form of the invention, any inaccuracies in the tread form, lead and inside diameter of the screw which affects assembly-ability of the screw will be indicated upon the dial of indicator 30, while the indicator 32 is for indicating whether or not the pitch diameter thereof is within the allowable limits. When these characteristics satisfy the standards, the pointers in cooperation with the dial graduations so indicate it but any deviation beyond predetermined limits are visually indicated.

The threads of the blocks and the members 48 may be arranged so that the gauge blocks in cooperation with the indicators will give indications of any desired screw or thread characteristics and the indicia of the indicator dials may be varied within wide limits for various purposes.

As stated heretofore, the gauge blocks are removable from the body and slide so that various pairs of blocks for numerous gauging operations may be employed.

The gauge device being formed for manual engagement and operation by one hand makes it possible to perform successive gauging operations with great rapidity.

The invention is presented to fill a need for improvements in a gauging device. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by expanding the construction, operation and advantages thereof.

What is claimed is:

1. A gauge for screw threads comprising a frame, a gauging member carried by the frame and having a threaded concave gauging portion, a second gauging member carried by the frame having a threaded concave gauging portion, means mounting one of the members upon the frame in cooperative relation with the other member to gauge a screw thread and for movement towards and from the other for insertion of the test part therewithin, means for indicating the position of the movable gauging member, a recess in one of the gauging members, a second gauging means projected into the recess to engage at least one thread of the test part, and means to indicate the position of the second gauging means.

2. A gauge for screw threads comprising a frame, a gauging member carried by the frame and having a threaded concave gauging portion, a second gauging member carried by the frame having a threaded concave gauging portion, means mounting one of the members upon the frame in cooperative relation with the other member to gauge a screw thread and for movement towards and from the other for insertion of the test thread therewith, means for indicating the position of the movable gauging member, a recess in the movably mounted gauging member, a second gauging means projected into the recess to engage at least one thread of the test part, and means carried by the movable mounting means to indicate the position of the second gauging means.

3. A gauge for screw threads comprising a frame, a gauging member carried by the frame and having a threaded concave gauging portion, a second gauging member carried by the frame having a threaded concave gauging portion, means mounting one of the members upon the frame in cooperative relation with the other member to gauge a screw thread and for movement towards and from the other for insertion of the test part therewithin, means for indicating the position of the movable gauging member, a recess in one of the gauging members, a second gauging means movably mounted upon one of the gauging members and projected into the recess to engage at least one thread of the test part, and means to indicate the position of the second gauging means.

4. A gauge for screw threads comprising a frame, a gauging member carried by the frame and having a threaded concave gauging portion, a second gauging member carried by the frame having a threaded concave gauging portion, means mounting one of the members upon the frame in cooperative relation with the other member to gauge a screw thread and for movement towards and from the other for insertion of the test part therewithin, means for indicating the position of the movable gauging member, a recess in the movable gauging member, a second gauging means movably mounted upon the movable gauging member and projected into the recess to engage at least one thread of the test part, and means to indicate the position of the second gauging means.

5. A gauge for screw threads comprising a frame, a gauging member fixed to the frame and having a threaded concave gauging portion, a second gauging member having a threaded concave gauging portion, means mounting the second gauging member upon the frame in cooperative relation with the other member to gauge a screw thread and for sliding movement towards and from the other for insertion of the test part therewithin, means carried by the frame for indicating the position of the movable gauging member, a recess in the center of the second gauging member, pitch diameter gauging means slidably carried by the second gauging member and projected into the recess to engage at least one thread of the test part, and means carried by the slidable mounting means to indicate the position of the pitch diameter gauging means.

6. A gauge device for gauging screw threads and the like comprising in combination, a body having a depending hand grip, a slide guided in said body for movements in and out relative to said body, a trigger member on said slide engageable by a finger when the said grip is held by the hand for moving said slide inwardly to gauging position on the body, gauge block means carried by said body and slide having means for engaging the threads of a screw when the slide is in gauging position relative to the body, indicators carried by said body and slide respectively having yieldable plungers, operating means carried by the slide for operatively engaging the plunger of the indicator of the body, and operating means carried by the block on the slide for operating the indicator on the slide.

7. A gauge device for gauging screw threads and the like comprising in combination, a body having a depending hand grip, a slide guided in said body movements in and out relative to said body, a trigger member on said slide engageable by a finger when the said grip is held by the hand for moving said slide inwardly to gauging position on the body, gauge block means carried by said body and slide having means for engaging the threads of a screw when the slide is in gauging position relative to the body, indicators carried by said body and slide respectively having yieldable plungers, operating means carried by the slide for operatively engaging the plunger of the indicator of the body, operating means carried by the block on the slide for operating the indicator on the slide, and means interposed between parts of said slide and body to urge the slide outwardly of the body from gauging position thereon.

8. A gauge device for gauging screw threads and the like comprising in combination, a body having a depending hand grip, a slide guided in said body for movements in and out relative to said body, a trigger member on said slide engageable by a finger when the said grip is held by the hand for moving said slide inwardly to gauging position on the body, gauge block means carried by said body and slide having means for engaging the threads of a screw when the slide is in gauging position relative to the body, an indicator carried by said body having a yieldable plunger, operating means carried by the slide for operatively engaging the plunger of the indicator of the body, a pilot member movable in and out on the block carried by the slide and provided on the inner face thereof with means for engaging between the threads of a screw to be gauged on the pitch diameter thereof, and an indicator carried by the slide to indicate the position of the pitch diameter gauging means.

9. A gauge device for gauging screw threads and the like comprising in combination, a body having a depending hand grip, a slide guided in said body for movements in and out relative to said body, a trigger member on said slide engageable by a finger when the said grip is held by the hand for moving said slide inwardly to gauging position on the body, gauge block means carried by said body and slide having means for engaging the threads of a screw when the slide is in gauging position relative to the body, an indicator carried by said body having a yieldable plunger, operating means carried by the slide for operatively engaging the plunger of the indicator of the body, a pilot member movable in and out on the block carried by the slide and provided on the inner face thereof with means for engaging between the threads of a screw to be gauged on the pitch diameter thereof, said last named means including members separate from the block secured thereto at opposite ends to have intermediate portions for engaging between the threads of a screw, and an indicator carried by the slide to indicate the position of the pitch diameter gauging means.

10. A gauge device for gauging screw threads and the like comprising in combination, a body member having a depending hand grip, a slide member guided in said body for movements in and out relative to said body, a trigger on said slide engageable by a finger when the said grip is held by the hand for moving said slide member inwardly to gauging position on the body member, gauge block means carried by said body and slide members having means for engaging the threads of a screw when the slide member is in gauging position relative to the body member, indicators carried by said members having yieldable plungers, operating means carried by the slide member for operatively engaging the plunger of one of said indicators, and operating means carried by the block on the slide for operating the other of said indicators, the gauge block means carried by the block on the slide member including a block and a pilot member movable in and out on said block provided on the inner face thereof with means for engaging between the threads of a screw to be gauged on the pitch diameter thereof.

11. A gauge for screw threads comprising a frame, a gauging member carried by the frame and having a gauging portion of substantial length for engaging a plurality of threads, a second gauging member having a thread gauging portion, means mounting the members upon the frame in cooperative relation with each other to gauge a screw thread, a recess in the center of the gauging member of substantial length, pitch diameter gauging means carried in the recess for engaging at least one thread of a test part while the latter is engaged by the gauging members, means mounting the pitch diameter gauging means for movement, and means to indicate the position of the pitch diameter gauging means.

12. A gauge for screw threads comprising a frame, a gauging member carried by the frame and having a gauging portion of substantial length for engaging a plurality of threads, a second gauging member having a thread gauging portion, means mounting the members upon the frame in cooperative relation with each other to gauge a screw thread and mounting one of said members for movement relatively to the other, a recess in the center of the gauging member of substantial length, and pitch diameter gauging means carried in the recess for engaging at least one thread of a test part while the latter is engaged by the gauging members, and means to indicate the position of the movable gauging member.

13. A gauge for screw threads comprising a frame, a gauging member carried by the frame and having a gauging portion of substantial length for engaging a plurality of threads, a second gauging member having a thread gauging portion, means mounting the members upon the frame in cooperative relation with each other to gauge a screw thread and for opening and closing movement for insertion of a test part therebetween, means for indicating the position of a gauging member, the gauging member of substantial length having a central recess, pitch diameter gauging means carried in the recess for engaging at least one thread of a test part while the latter is engaged by the gauging members, means mounting the pitch diameter gauging means for movement within the central recess, and means to indicate the position of the pitch diameter gauging means.

14. A gauge for screw threads comprising a frame, a gauging member carried by the frame and having a threaded gauging portion of substantial length for engaging a plurality of threads, a second gauging member having a threaded gauging portion, means mounting one of the members upon the frame in cooperative relation with the other member to gauge a screw thread and for sliding movement towards and from the other for insertion of a test part therewithin, means for indicating the position of the movable gauging member, a central recess in the gauging member of substantial length, pitch diameter gauging means carried in the recess for engaging at least one thread of a test part while the latter is engaged by the gauging members, and means to indicate the position of the pitch diameter gauging means.

15. A gauge for screw threads comprising a frame, a gauging means including a gauging member carried by the frame and having a gauging portion of substantial length for engaging a plurality of threads, and a second gauging member having a thread gauging portion, means mounting the members upon the frame in cooperative relation with each other to gauge a screw thread, a recess in the center of the gauging member of substantial length, pitch diameter gauging means carried in the recess for engaging at least one thread of a test part while the latter is engaged by the gauging members, means mounting one of the gauging means for movement, and means to indicate the position of the movable gauging means.

WILLIAM CLAY MOORE.

REFERENCES CITED

The following references are of record in the file of this patent:

UNITED STATES PATENTS

| Number | Name | Date |
| --- | --- | --- |
| 1,337,018 | Lockey et al. | Apr. 13, 1920 |

FOREIGN PATENTS

| Number | Country | Date |
| --- | --- | --- |
| 49,164 | Sweden | 1921 |
| 312,942 | Germany | 1919 |
| 425,029 | Germany | 1926 |

Certificate of Correction

Patent No. 2,440,967.  May 4, 1948.

WILLIAM CLAY MOORE

It is hereby certified that errors appear in the printed specification of the above numbered patent requiring correction as follows: Column 4, line 75, for the word "tread" read *thread*; column 5, line 33, for "expanding" read *explaining*; and that the said Letters Patent should be read with these corrections therein that the same may conform to the record of the case in the Patent Office.

Signed and sealed this 29th day of June, A. D. 1948.

[SEAL]

THOMAS F. MURPHY,
*Assistant Commissioner of Patents.*